United States Patent [19]

Kidai et al.

[11] Patent Number: 5,518,818
[45] Date of Patent: May 21, 1996

[54] PRIMER AND MULTILAYER COATED ARTICLE

[75] Inventors: Masayuki Kidai, Kusatsu; Hiroko Fujimoto, Otokuni; Takashi Taniguchi, Yasu, all of Japan

[73] Assignee: Toray Industries, Inc., Japan

[21] Appl. No.: 129,060

[22] PCT Filed: Feb. 5, 1992

[86] PCT No.: PCT/JP92/00119

§ 371 Date: Oct. 4, 1993

§ 102(e) Date: Oct. 4, 1993

[87] PCT Pub. No.: WO93/16138

PCT Pub. Date: Aug. 19, 1993

[51] Int. Cl.$^6$ .................................................. B32B 27/36
[52] U.S. Cl. ................ 428/412; 428/413; 428/423.1; 428/424.2; 428/424.4; 428/447; 428/451; 428/480; 428/483; 428/515; 428/520; 525/327.3
[58] Field of Search ............................ 428/412, 413, 428/423.1, 424.2, 424.4, 447, 451, 480, 483, 515, 520; 525/327.3

[56] References Cited

U.S. PATENT DOCUMENTS

| | | | |
|---|---|---|---|
| 4,216,267 | 8/1980 | Lorenz et al. | 428/412 |
| 4,708,908 | 11/1987 | Tateoka et al. | 428/423.1 |
| 4,847,120 | 7/1989 | Gent | 427/387 |
| 4,880,859 | 11/1989 | Stongo et al. | 524/91 |
| 4,927,891 | 5/1990 | Kamath et al. | 525/327.3 |

FOREIGN PATENT DOCUMENTS

| | | |
|---|---|---|
| 55-75459 | 6/1980 | Japan . |
| 56-125414 | 10/1981 | Japan . |
| 57-74310 | 5/1982 | Japan . |
| 64-1712 | 1/1989 | Japan . |
| 2-219802 | 9/1990 | Japan . |
| 2-281006 | 11/1990 | Japan . |
| 2-274736 | 11/1990 | Japan . |
| 3-163177 | 7/1991 | Japan . |

OTHER PUBLICATIONS

Kunio Goto "The Practical Handbook of Plastics and Additives for Rubber," Oct. 1, 1972 (1, Oct. 1972), Kagaku Kogyosha, 1. 1–4, p. 307 6th to 5th lines from the bottom, p. 307.

Primary Examiner—D. S. Nakarani
Attorney, Agent, or Firm—Austin R. Miller

[57] ABSTRACT

A primer comprising a polymer which comprises copolymerized units of an UV absorber having an unsaturated double bond, and a multilayer coated article comprising a substrate, a coating of the primer and a surface coating. The coatings of the multilayer coated article exhibit excellent weathering-resistant adhesion to a substrate, and they improve the surface properties thereof, such as surface hardness, scuff resistance, wear resistance and surface gloss. Accordingly, the coatings can impart excellent durability to the article and inhibit weathering deterioration of the substrate.

16 Claims, No Drawings

PRIMER AND MULTILAYER COATED ARTICLE

TECHNICAL FIELD

The present invention relates to a coating used for improving the surface properties such as surface hardness, scuff resistance, wear resistance and surface gloss, of a variety of substrates, a primer for improving weathering-resistant adhesion to substrates, and a multilayer coated article.

BACKGROUND ART

Various coatings have been proposed to improve the surface properties, such as scuff resistance, wear resistance, surface hardness and surface gloss, of various substrates. Many primers have also heretofore been proposed to improve the adhesion between the coatings and the substrates.

Furthermore, for the purpose of preventing the substrates, the primer coatings or surface coatings from being subjected to deterioration and yellowing or peeling, caused by UV-rays in sunlight, during outdoor use, there have been made many attempts to add UV absorbers to the substrates, the surface coatings or the primer coatings.

For example, there have been the following disclosures: attempts to add UV absorbers to the substrates have been disclosed by Kokai (Japanese Unexamined Patent Publication) Nos. 62-146951 and 1-247431; attempts to add UV absorbers to the primer coatings have been disclosed by Kokai (Japanese Unexamined Patent Publication) Nos. 2-16129, 2-16048 and 61-86259; and attempts to add UV absorbers to the surface coatings have been disclosed by Kokai (Japanese Unexamined Patent Publication) Nos. 1-96266, 1-55307 and 63-83117.

DISCLOSURE OF INVENTION

However, in the prior art techniques as described above, the added UV absorbers bleed when exposed outdoors for a long period of time, and as a result the coatings peel off, or the substrates and primer coatings exhibit yellowing (discoloration). Accordingly, the addition of UV absorbers cannot be considered as fundamentaly improving the weathering resistance of the substrates.

The present invention is intended to solve the problems as described above, and has the following construction:

(1) A primer comprising a polymer which comprises copolymer units of an UV absorber having an unsaturated double bond; and (2) A multilayer-coated article comprising a substrate, a primer coating which comprises a polymer comprising copolymerized units of an UV absorber having an unsaturated double bond on the substrate, and a hard coating on the primer coating.

BEST MODE FOR CARRYING OUT THE INVENTION

Examples of the UV absorber having an unsaturated double bond in the present invention are UV absorbers of benzotriazole type, benzophenone type, benzophenolate type, etc. There is no specific limitation on the fundamental structure of the UV absorbers, and UV absorbers having an unsaturated double bond are employed.

For example, examples of the benzophenone UV absorber having an unsaturated double bond include compounds having the following structure:

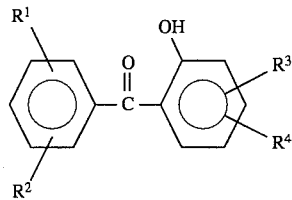

wherein at least one of $R^1$, $R^2$, $R^3$ and $R^4$ is an organic group having an unsaturated double bond ($>C=C<$), and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, acid group and an ester of a phosphoric acid group and are not specifically restricted.

Furthermore, examples of the benzotriazole UV absorber having an unsaturated double bond include compounds having the following structure:

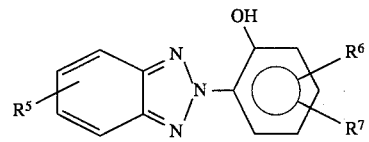

wherein at least one of $R^5$, $R^6$ and $R^7$ is an organic group having an unsaturated double bond, and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group and are not specifically restricted.

Still furthermore, examples of the phenyl benzoate UV absorber having an unsaturated double bond include compounds having the following structure:

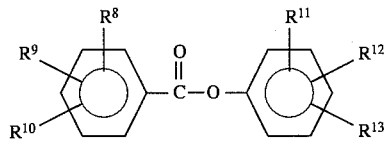

wherein at least one of $R^8$–$R^{13}$ is an organic group having an unsaturated double bond, and the others are each independently a substituent group such as an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester a phosphoric acid group and are not specifically restricted.

Examples of the unsaturated double bond contained in the UV absorbers in the present invention are a vinyl group, an allyl group, a vinylene group, a (meth)acryloyl group, etc. Though there is no specific limitation on these groups, the (meth)acryloyl group being preferable in view of its reactivity.

The primer of the present invention comprises a polymer formed by copolymerization of the UV-absorber having an unsaturated double bond as mentioned above with other monomer. Though there is no particular limitation on the copolymer component other than the UV absorber in the primer, those monomers having an unsaturated double bond or functional group reactive with the unsaturated double bond of the UV absorber are used.

Those monomers which have an unsaturated double bond and form copolymerized units of the primer are not specifically restricted to vinyl monomers or (meth)acrylic ester monomers. Examples of the monomers are various (meth)acrylate derivatives such as (meth)acrylic acid, methyl (meth)acrylate, ethyl (meth)acrylate, propyl (meth)acrylate, butyl (meth)acrylate, isobutyl (meth)acrylate, pentyl (meth)acrylate, hexyl (meth)acrylate, cyclohexyl (meth)acrylate, heptyl (meth)acrylate, octyl (meth)acrylate, lauryl (meth)acrylate, dodecyl (meth)acrylate, stearyl (meth)acrylate, 2-hydroxyethyl (meth)acrylate, 2-hydroxy-propyl (meth)acrylate, methoxyoligoethylene glycol (meth)acrylate, glycidyl (meth)acrylate, (meth)acrylamide, N,N-dimethylaminoethyl (meth)acrylate and N,N-diethyl-aminoethyl (meth)acrylate, various polyfunctional (meth)acrylate derivatives such as ethylene glycol di(meth)acrylate, diethylene glycol di(meth)acrylate, 1,3-propanediol di(meth)acrylate, 1,4-butanediol di(meth)acrylate, 1,6-hexanediol di(meth)acrylate, neopentyl glycol di(meth)acrylate, trimethylolpropane (di/tri) (meth)acrylate, pentaerythritol (di/tri/tetra)(meth)acrylate and oligoethylene glycol di(meth)acrylate, various vinyl group-containing monomers such as butadiene, isoprene, styrene, a styrene derivative and divinylbenzene, and the like. Of these monomers, it is preferable to use one kind or at least two kinds of these monomers which improve the adhesion between various plastic substrates and surface coatings without impairing the surface properties of the surface coatings, such as surface hardness and scuff resistance, corresponding to the substrates and the surface coatings. To realize good weathering-resistant adhesion, the primer is allowed to contain copolymerized units of the UV absorber preferably in an amount of 0.1 to 20% by weight, more preferably 1 to 10% by weight based on the entire monomers, though the amount depends on the type of the substrate and the surface coating.

Examples of the monomer having a functional group capable of reacting with the unsaturated double bond of the UV absorber are a hydroxy group, a thiol group, an imino group, etc. A monomer having an unsaturated double bond and a monomer having a functional group capable of reacting with the unsaturated double bond of the UV absorber may both be used as the copolymer component of the UV absorber.

Furthermore, the primer of the invention may also contain copolymerized units of a monomer other than those mentioned above. For example, it is a preferable embodiment to use an antioxidant monomer and a light stabilizer monomer having an unsaturated double bond as the copolymer component for the purpose of further improving the weathering resistance by their use with the UV absorber in combination. Examples of the monomers are 2,2,6,6-tetramethyl-4-piperidyl acrylate, 2,2,6,6-tetramethyl-4-piperidyl methacrylate, 1,2,2,6,6-pentamethyl-4-piperidyl acrylate, 1,2,2,6,6-pentamethyl-4-piperidyl methacrylate, and the like.

There is no specific limitation on the method for coating various substrates with the primer containing the UV absorber as a copolymer component in the present invention. However, methods such as those described below may be employed: a method wherein a substrate is coated with a precopolymerized polymer solution, and dried; and a method wherein a substrate is coated with a mixture of monomers, which are polymerized thereon.

At the time of precopolymerization, any of polymerization methods such as bulk polymerization, solution polymerization, suspension polymerization and emulsion polymerization may be employed. However, solution polymerization is preferable because a coating solution for the primer is prepared at the time of coating the substrate with the primer. The polymer thus obtained is subjected to processing if necessary such as solubilization, dilution and solvent replacement to obtain a copolymerized polymer solution for the primer. A substrate is coated with the solution, and dried to obtain a primer coating.

When a substrate is coated with the monomer mixture and the monomer mixture is polymerized thereon, the substrate may be coated with the monomer mixture not having been processed or having been diluted with a solvent, and the mixture may be polymerized by irradiation with rays such as UV-rays, electron beams and γ-rays, or by heating with hot air, IR-rays, etc.

A substrate may also be coated with the polymer in which the UV absorber is copolymerized, or the monomer mixture, after diluting with a suitable solvent. In the case of adding solvent, there is no specific limitation on the solvent. The solvent should be determined by considering the mutual solubility with the copolymerized polymer, the adhesion thereof to the substrate, etc., and one or at least two solvents may be employed.

Furthermore, various additives may also be added to the polymer which forms these primer coatings and in which the UV absorber is copolymerized, and the monomer mixture. UV absorbers, antioxidants and light stabilizers other than those mentioned above may be added to further improve the weathering resistance. It is a preferable embodiment to use various surfactants for the purpose of improving the flow of the primer during coating. Examples of the especially effective surfactant are block or graft copolymers of dimethylpolysiloxanes and alkylene oxides, fluorine type surfactants, and the like.

Although the copolymerized polymer or monomer mixture may be applied to a substrate by ordinary coating operations, preferable examples of the coating method are immersion coating, curtain coating, spin coating, brush coating, spray coating, roll coating, curtain flow coating, etc.

The thickness of the coating of the primer of the present invention should be determined by considering the properties of the surface coating to be formed on the primer coating and the adhesion of the primer coating to the substrate. Though there is no specific limitation thereon, the thickness is 0.05 to 50 μm, preferably 0.1 to 10 μm.

Examples of the surface coating to be formed on the primer coating used in the present invention are an acrylic coating, a silane type coating, an isocyanate type coating, a melamine type coating, an epoxy type hard coat, etc., and there is no specific limitation thereon. However, an organopolysiloxane hard coat is preferably used due to its weathering resistance.

Typical examples of the composition to form the organopolysiloxane hard coat are at least one organosilicon compound and/or its hydrolyzed product selected from the group consisting of organosilicon compounds represented by the general formula (I) and their hydrolyzed products, and organosilicon compounds represented by the general formula (II) and their hydrolyzed products

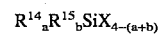

$$R^{14}{}_{a}R^{15}{}_{b}SiX_{4-(a+b)} \qquad (I)$$

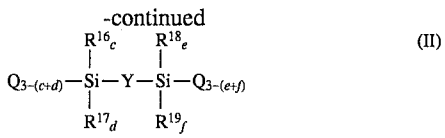

(II)

wherein $R^{14}$, $R^{15}$, $R^{16}$, $R^{17}$, $R^{18}$ and $R^{19}$ are each an organic group having from 1 to 10 carbon atoms, X and Q are each a hydrolyzable group, a, c and e are each 0 or 1, b, d and f are each 0, 1 or 2, and Y is an organic group having from 2 to 40 carbon atoms.

Firstly, the organosilicon compounds represented by the general formula (I) and their hydrolyzed products are illustrated below.

$R^{14}$ and $R^{15}$ in the general formula (I) are each an organic group having from 1 to 10 carbon atoms. Concrete examples of the organic group are hydrocarbon groups such as a methyl group, an ethyl group, a phenyl group and a vinyl group, halogenated hydrocarbon groups such as a chloropropyl group and a 3,3,3-trifluoropropyl group, epoxy group-containing organic groups such as a γ-glycidoxypropyl group and a β-(3,4-epoxycyclohexyl)ethyl group, (meth)acrylic group-containing organic groups such as a γ-methacryloxypropyl group and a γ-acryloxypropyl group, other organic groups having various substituent groups such as a mercapto group, a cyano group and an amino groups, and the like. $R^{14}$ and $R^{15}$ may be the same as or different from each other.

Furthermore, X is not specifically restricted so long as it is a hydrolyzable functional group, that is, a silanol group is formed by hydrolysis of X. Concrete examples of X are alkoxy groups such as a methoxy group, an ethoxy group and a methoxyethoxy group, acyloxy groups such as an acetoxy group, halogeno groups such as a chloro group and a bromo group, aryloxy groups such as a phenoxy group, and the like.

Furthermore, in the case of a+b being at least 2, at least one of $R^{14}$ and $R^{15}$ is preferably a reactive organic group such as an epoxy group-containing organic group and a (meth)acryloxy group-containing organic group in view of the surface hardness.

Concrete typical examples of these organosilicon compounds are trialkoxysilanes, triacyloxysilanes or triphenoxysilanes such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltrimethoxyethoxysilane, γ-mercaptopropyltriethoxysilane, N-β-(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxy-silane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltrimethoxysilane, β-(3,4-epoxycylcohexyl)ethyltrimethoxysilane, β-(3,4-epoxycyclohexyl)ethyltriethoxysilane, β-(3,4-epoxycyclohexyl)ethyltripropoxysilane, γ-(3,4-epoxycyclohexyl)ethyltributoxysilane, γ-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, or the hydrolyzed products of trialkoxysilanes, triacyloxysilanes or triphenoxysilanes, dialkoxysilanes, diphenyoxysilanes or diacyloxysilanes such as dimethyldimethoxysilane, phenylmethyldimethoxysilane, dimethyldimethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxy-silane, γ-aminopropylmethyldiethoxysilane, methylvinyldimethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylmethyldiacetoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane and γ-glycidoxypropylphenyldiethoxysilane, and the hydrolyzed products of dialkoxysilanes, diphenoxysilanes or diacyloxysilanes.

Next, the other organosilicon compounds represented by the general formula (II) and their hydrolyzed products are illustrated below.

Examples of $R^{16}$, $R^{17}$, $R^{18}$ and $R^{19}$ in the general formula (II) are the same as those of $R^{14}$ and $R^{15}$ in the general formula (I). Moreover, examples of Q are the same as those of X. Y is an organic group having from 2 to 40 carbon atoms. That is, Y is a functional group contained in the molecule through another two Si atoms each bonding to Y with Si—C bonds, and there is no problem at all even when the functional group contains atoms other than carbon and hydrogen atoms, such as an oxygen atom and a nitrogen atom. The organic group may be chain-like or cyclic so long as it has from 2 to 40 carbon atoms. The presence of an oxygen atom, etc., in the form of an epoxy ring, etc., not only causes no problem at all, but also preferably contributes as a functional group during curing.

Concrete examples of Y are as follows:

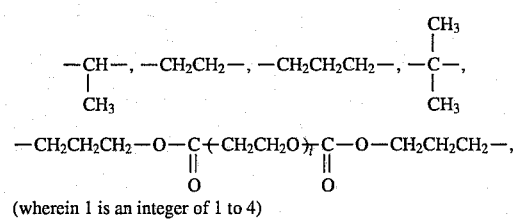

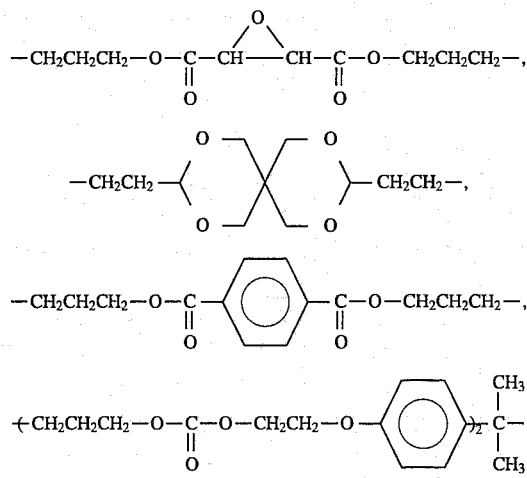

The use of an organosilicon compound containing an epoxy group or glycidoxy group as the organosilicon compound represented by the general formula (I) or (II) is particularly suitable for imparting flexibility. Moreover, an organosilicon compound containing a vinyl group, a methyl group, a phenyl group, etc., is preferably used for imparting weathering resistance and water resistance. An alkoxy group or alkoxyalkoxy group having from 1 to 4 carbon atoms is preferably used as X or Q in view of the curing rate and the facility of hydrolysis.

Of these organosilicon compounds and/or their hydrolyzed products, the hydrolyzed products are preferable from the standpoint of lowering the curing temperature and promoting curing.

The hydrolyzed products are prepared by adding pure water, or an acidic aqueous solution of an acid such as hydrochloric acid, acetic acid or sulfuric acid to the organosilicon compounds and stirring the mixture. Furthermore, it becomes readily possible to control the degree of hydrolysis by adjusting the addition amount of pure water or the acidic aqueous solution. Pure water or the acidic aqueous solution is added at the time of hydrolysis particularly preferably in a molar ratio of pure water or the acidic aqueous solution to X or Q in the general formula (I) or (II) of at least 1 to up to 3 from the standpoint of the promotion of curing.

Since alcohol, etc., is formed during hydrolysis, hydrolysis may be carried out without a solvent. Hydrolysis may also be carried out after mixing the organosilicon compound with a solvent for the purpose of more uniformly carrying out hydrolysis. Moreover, the hydrolyzed product may be used after removing a suitable amount of the alcohol, etc., by heating and/or reducing the pressure, and, thereafter, a suitable solvent may also be added to the hydrolyzed product, the selection of these procedures depending on the application thereof.

Examples of the solvent are alcohols, esters, ethers, ketones, halogenated hydrocarbons, aromatic hydrocarbons such as toluene and xylene and solvents such as N,N-dimethylformaide. These solvents may also be optionally used as a solvent mixture of at least two of them.

It is naturally possible that the hydrolysis reaction mixture should be heated to a temperature of at least room temperature to accelerate hydrolysis and further promote reactions such as precondensation, and that hydrolysis should also be carried out by lowering the hydrolysis temperature to room temperature to inhibit precondensation, the procedures depending on the application of the hydrolyzed product.

Furthermore, a particulate inorganic oxide is preferably used as an ingredient for improving the hardness of the surface coating. There is no specific limitation on the inorganic oxide so long as it does not impair the transparency of the coating in a coated state and achieve the application of its use. However, particularly preferable examples are colloidally dispersed sols from the standpoint of processability and imparting transparency. More concrete examples thereof are a silica sol, a titanium oxide sol, a cerium oxide sol, a zirconia sol, an antimony oxide sol, an alumina sol, etc. Further, a magnesium fluoride sol can be used for the same purpose. Although the addition amount of the particulate inorganic oxide is not particularly restricted, to obtain more significant effects, it is preferable that the particulate inorganic oxide should be contained in the cured coating in an amount of from at least 5% by weight to up to 80% by weight. That is, evident effects of the addition cannot be recognized when the amount is less than 5% by weight, and the resultant coating tends to exhibit insufficient adhesion to the primer coating, crack formation therewithin and the lowering of impact resistance thereof when the amount exceeds 80% by weight.

Although a particulate inorganic oxide having an average particle size of from 1 to 200 mμ is usually used, one having an average particle size of from 5 to 100 mμ is preferably used.

When the average particle size exceeds 200 mμ, the resultant coating has reduced transparency and exhibits a marked haze, and thick coating formation becomes difficult. When the average particle size is less than 1 mμ, the coating exhibits poor stability, and the reproducibility of the coating formation becomes poor. The addition of various surfactants and amines to improve the dispersibility of the fine particles causes no problem. Moreover, the use of at least two of the particulate inorganic oxides in combination causes no problem.

Furthermore, non-glare properties may also be imparted to the surface coating. Concrete examples of the method include the use of the silica sol aggregate and the addition of silica fine particles.

Still furthermore, a variety of surfactants may also be used for the coating composition for forming the surface coating to improve the flow of the coating composition during coating. It is particularly effective to use a block or graft copolymer of dimethylpolysiloxane and alkylene oxide, a fluorine type surfactant, etc.

An UV absorber may also be added to further improve the weathering resistance, and an antioxidant may also be added to improve the thermal deterioration resistance.

Furthermore, a variety of inorganic compounds, etc., may also be added to the compositions for the surface coating so long as the coating-formation properties, transparency, etc., are not markedly reduced. The use of these additives in combination can improve the adhesion between the surface coating and the substrate, and the properties of the surface coating, such as chemical resistance, surface hardness, durability and dyeing properties. Examples of the inorganic materials which can be added as mentioned above are metal alkoxides represented by the following general formula [III], and a variety of chelate compounds and/or their hydrolyzed products:

$$M(OQ)_m \quad \text{[III]}$$

wherein Q is an alkyl group, an acyl group or alkoxyalkyl group, m is a numerical value equal to the number of electric charges of metal M, and M is silicon, titanium, zircon, antimony, tantalum, germanium, aluminium, etc.

At the time of forming the surface coating in the present invention, various curing agents may be used to make it possible to promote curing, or cure at low temperature. Those curing agents which are used for curing various epoxy resins or various organosilicon resins, etc., may be used as the curing agents.

Concrete examples of these curing agents are various organic acids and their acid anhydrides, nitrogen-containing organic compounds, various metal complexes, metal alkoxides, alkali metal salts of organic carboxylic acids, various salts such as carbonates, radical polymerization initiators such as a peroxide and azobis(isobutyronitrile), and the like. A mixture of at least two of these curing agents may also be used. Among these curing agents, aluminum chelate compounds as described below are particularly useful for satisfying the objects of the present invention, from the standpoint of stabilizing the coating compositions and preventing the coloration of the coatings after their formation. That is, use can be made of aluminum chelate compounds represented by the general formula $AlT_rZ_{3-r}$ wherein T is OL (wherein L is a lower alkyl group), Z is at least one member selected from the group consisting of ligands derived from compounds represented by the general formula $M^1COCH_2COM^2$ (wherein $M^1$ and $M^2$ are each a lower alkyl group) and ligands derived from compounds represented by the general formula $M^3COCH_2COM^4$ (wherein $M^3$ and $M^4$ are each a lower alkyl group), and r is 0, 1 or 2. Of aluminum chelate compounds represented by the general formula $AlT_rZ_{3-r}$, particularly preferable are acetylacetonatoaluminum, monoacetylacetonatobis(ethylacetoacetato)aluminum, di-n-butoxide-monoethylacetoacetatoaluminum, di-isopropoxide-monomethylacetoacetatoaluminum, etc., in view of the solubility in the composition, the stability, the effects as curing catalysts, etc. These compounds may also be used as a mixture of at least two of them.

Methods used in conventional coating operations may be applied to the method for coating the compositions for the surface coating. Preferable examples of the coating method are immersion coating, curtain coating, spin coating, brush coating, spray coating, roll coating, curtain flow coating, etc.

The coating composition with which a substrate has been coated is generally cured by heating and drying.

Heating may be carried out by hot air, IR-rays, etc. Although the heating temperature should be determined by the substrate and the coating composition to be used, the temperature is usually from room temperature to 250° C., more preferably from 35° to 200° C. A heating temperature lower than that mentioned above may result in insufficient curing or drying. A heating temperature higher than that mentioned above causes thermal decomposition, crack formation, etc., and tends to cause problems such as yellow discoloration.

Though the thickness of the surface coating in the present invention is not specifically restricted, it is preferably from 0.1 to 200 μm, particularly preferably from 0.4 to 100 μm in view of the maintenance of the adhesion strength, the hardness, the surface gloss, etc.

Furthermore, the substrate or substrate provided with a primer may also be subjected to various chemical and physical treatments to further improve the adhesion and the wettability between the substrate and the primer coating, or the primer coating and the surface coating. Preferable examples of the chemical treatment are immersion in hot water, immersion in a solvent, oxidation and reduction treatment, treatment with an acid or alkali, etc. Preferable examples of the physical treatment are plasma treatment, corona discharge treatment, UV-ray irradiation, etc.

The primer coating or surface coating of the invention may be colored with dyes or pigments without impairing their properties. Coloration produces very high added values.

Though the substrate for the primer of the present invention is not specifically restricted, glass, plastics, etc., are preferable because the primer is a liquid coating material. A plastic substrate is often subjected to yellow discoloration or peeling of the surface coating by UV-ray irradiation when used outdoors. Accordingly, the primer of the present invention is particularly preferably used. Preferable examples of the plastic substrate are a polymethyl methacrylate and its copolymer, a polycarbonate, a poly[diethylene glycol bis-(allyl carbonate)] (trade name of CR-39), a polyester, particularly a polyethylene terephthalate, an unsaturated polyester, an acrylonitrile-styrene copolymer, a polyvinyl chloride, a polyurethane, an epoxy resin, and the like. The primer can also be favorably applied to the above-mentioned glass or plastic substrates coated with various coating materials.

There is no specific limitation on the uses of the primer of the invention so long as it is used in fields requiring weathering resistance. The primer is not only useful for construction materials, optical uses and agricultural uses but also it may be developed into a variety of applications.

The present invention is illustrated below with reference to examples, but it should be construed that the invention is in no way limited to those examples.

EXAMPLE 1

(1) Preparation of a primer composition

A four-necked flask equipped with a dropping funnel, a nitrogen inlet tube, a condenser and a stirrer was prepared. In the flask was placed 15 g of toluene, and the toluene was held at 50° C. To the toluene was added, by dropping with a dropping funnel over a period of one hour and a half, a mixture of 15 g of toluene, 63 g of methyl methacrylate, 7 g of a benzophenone type UV absorber having an unsaturated double bond and represented by the formula

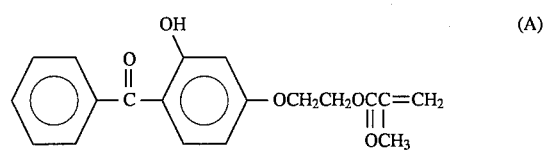

and 0.1 g of 2,2'-azobis(4-methoxy-2,4'-dimethylvaleronitrile) as a polymerization initiator. The reaction mixture was then stirred for 4 hours at a constant temperature to obtain a copolymerized polymer solution.

To 43.7 g of the copolymerized polymer solution were added 10 g of toluene, 31.5 g of methyl isobutyl ketone, 15.0 g of benzyl alcohol, 60.0 g of n-butanol and 0.08 g of SH-190 (trade name of a silicone surfactant manufactured by Dow Corning Toray Silicone Co., Ltd.), and the mixture was stirred until it became homogeneous.

(2) Preparation of an organopolysiloxane hard coat composition (a) To 263.7 g of vinyltriethoxysilane was added 19.8 g of acetic acid. The mixture solution was held at 10° C. with stirring, and 74.7 g of 0.05N HCl was added thereto to obtain a hydrolyzed product of vinyltriethoxysilane.

(b) To 378.0 g of methyltrimethoxysilane was added 28.8 g of acetic acid. The mixture solution was held at 10° C., and 149.4 g of 0.01N HCl was added thereto to obtain a hydrolyzed product of methyltrimethoxysilane.

(c) The hydrolyzed product of vinyltriethoxysilane in an amount of 352.6 g obtained in (a) and the hydrolyzed product of methyltrimethoxysilane in an amount of 547.4 g obtained in (b) were mixed by stirring. To the mixture were further added 2 g of sodium acetate, 80 g of xylene, 20 g of butyl acetate and 1.5 g of SRX-298 (trade name of a silicone surfactant manufactured by Dow Corning Toray Silicone Co., Ltd. ), and the mixture was stirred, until it became homogeneous, to obtain a hard coat composition.

(3) Coating and curing

A polycarbonate plate was used as a plastic substrate. The plate was cleaned, dried, and coated with the primer composition prepared in (1) by immersion coating under the condition of a pulling speed of 20 cm/min. The coated plate was cured by heating for an hour with a hot air drier at 93° C. The plate coated with the primer composition was further coated with the hard coat composition prepared in (2) under the same condition mentioned above. The coated plate was cured by heating for 2 hours with a hot air drier at 140° C.

(4) Test results

The plastic plate having coatings thus obtained was evaluated by the following test procedures. The results thus obtained are shown in Table 1.

(a) Appearance

The transparency, the coloring properties and the cracks of the coating film were visually observed.

(b) Hardness

The coatings were rubbed with #0000 steel wool, and the degree of flaw formation was judged. The judging standard is as follows: A: almost no flaws are formed even when the coatings are strongly rubbed; and B: slight flaws are formed when the coatings are strongly rubbed.

(c) Adhesion

On the coatings were formed 100 cross hatches each 1 square millimeter. A cellophane adhesive tape (trade name of Cellophane Tape manufactured by Nichiban K.K.) was firmly applied to the coatings, and quickly peeled off in the direction making an angle of 90° with the applied portion of the tape, and the peel of the coatings was examined.

(d) Coloring properties

The degree of yellow discoloration, YI, was measured using a color computer (manufactured by Suga Shikenki K.K.).

(e) Weathering resistance

Weathering test was conducted on the coatings for 300 hours using Q.U.V. (manufactured by Q-panel Co., Ltd.) as a weatherometer, and (c) and (d) described above were measured.

EXAMPLE 2

(1) Preparation of a primer composition

A four-necked flask equipped with a dropping funnel, a nitrogen inlet tube, a condenser and a stirrer was prepared. In the flask was placed 15 g of toluene, and the toluene was held at 50° C. To the toluene was added, by dropping with a dropping funnel over a period of one hour and a half, a mixture of 15 g of toluene, 66.5 g of methyl methacrylate, 3.5 g of the compound represented by the formula (A) and having been used in Example 1 as a benzophenone type UV absorber having an unsaturated double bond and 0.1 g of 2,2'-azobis(4-methoxy-2,4'-dimethylvaleronitrile) as a polymerization initiator. The reaction mixture was then stirred for 4 hours at a constant temperature to obtain a copolymerized polymer solution.

Various solvents were added to the copolymer solution in the same manner as in Example 1 to obtain a primer composition.

(2) Coating and curing

A polycarbonate plate was used as a plastic substrate. The plate was cleaned, dried, and coated with the primer composition prepared in (1) by immersion coating. The procedures of Example 1 were repeated with regard to the coating and drying conditions, and coating and curing of the surface hard coat.

(3) Test results

The plastic plate having the coatings thus obtained was evaluated in the same manner as in Example 1. The results thus obtained are shown in Table 1.

EXAMPLE 3

(1) Preparation of a primer composition

A four-necked flask equipped with a dropping funnel, a nitrogen inlet tube, a condenser and a stirrer was prepared. In the flask was placed 15 g of toluene, and the toluene was held at 50° C. To the toluene was added, by dropping with a dropping funnel over a period of one hour and a half, a mixture of 15 g of toluene, 66.5 g of methyl methacrylate, 3.5 g of a compound represented by the formula (B)

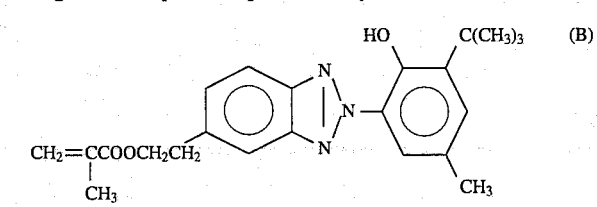

as a benzotriazole type UV absorber having an unsaturated double bond and 0.1 g of 2,2'-azobis(4-methoxy-2,4'-dimethylvaleronitrile) as a polymerization initiator. The reaction mixture was then stirred for 4 hours at a constant temperature to obtain a copolymerized polymer solution.

Various solvents were added to the copolymerized polymer solution in the same manner as in Example 1 to obtain a primer composition.

(2) Coating and curing

A polycarbonate plate was used as a plastic substrate. The plate was cleaned, dried, and coated with the primer composition prepared in (1) by immersion 30 coating. The procedures of Example 1 were repeated with regard to the coating and drying conditions, and coating and curing of the surface hard coat.

(3) Test results

The plastic plate having the coatings thus obtained were evaluated in the same manner as in Example 1. The results thus obtained are shown in Table 1.

EXAMPLE 4

(1) Preparation of a primer composition

A four-necked flask equipped with a dropping funnel, a nitrogen inlet tube, a condenser and a stirrer was prepared. In the flask was placed 15 g of toluene, and the toluene was held at 50° C. To the toluene was added, by dropping with a dropping funnel over a period of one hour and a half, a mixture of 15 g of toluene, 60 g of methyl methacrylate, 3.5 g of a compound represented by the general formula (A) as a benzophenone type UV absorber having an unsaturated double bond and used in Example 1, 3.5 g of a hindered amine methacrylate compound having the structure

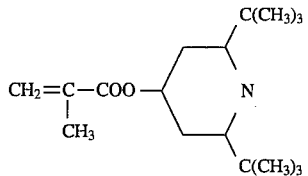

as a light stabilizer and 0.1 g of 2,2'-azobis(4-methoxy-2, 4'-dimethylvaleronitrile) as a polymerization initiator. The reaction mixture was then stirred for 4 hours at a constant temperature to obtain a copolymerized polymer solution.

Various solvents were added to the copolymer solution in the same manner as in Example 1 to obtain a primer composition.

(2) Coating and curing

A polycarbonate plate was used as a plastic substrate. The plate was cleaned, dried, and coated with the primer composition prepared in (1) by immersion coating. The procedures of Example 1 were repeated with regard to the coating and drying conditions, and coating and curing of the surface hard coat film.

(3) Test results

The plastic plate having the coatings thus obtained was evaluated in the same manner as in Example 1. The results thus obtained are shown in Table 1.

Comparative Example 1

(1) Preparation of a primer composition

A four-necked flask equipped with a dropping funnel, a nitrogen inlet tube, a condenser and a stirrer was prepared. In the flask was placed 15 g of toluene, and the toluene was held at 50° C. To the toluene was added, by dropping with a dropping funnel over a period of one hour and a half, a mixture of 15 g of toluene, 70 g of methyl methacrylate and 0.1 g of 2,2'-azobis(4-methoxy-2,4'-dimethylvaleronitrile) as a polymerization initiator. The reaction mixture was then stirred for 4 hours at a constant temperature to obtain a polymer solution.

Various solvents were added to the polymer solution in the same manner as in Example 1 to obtain a primer composition.

(2) Coating and curing

A polycarbonate plate was used as a plastic substrate. The plate was cleaned, dried, and coated with the primer composition prepared in (1) by immersion coating. The procedures of Example 1 were repeated with regard to the coating and drying conditions, and coating and curing of the surface hard coat.

(3) Test results

The plastic plate having coatings thus obtained was evaluated in the same manner as in Example 1. The results thus obtained are shown in Table 1.

Comparative Example 2

(1) Preparation of a primer composition

To the primer composition obtained in Comparative Example 1 was added 5 g of 2-hydroxybenzophenone as an UV absorber, and the mixture was stirred until it became uniform to obtain a primer composition.

(2) Coating and curing

A polycarbonate plate was used as a plastic substrate. The plate was cleaned, dried, and coated with the primer composition prepared in (1) by immersion coating. The procedures of Example 1 were repeated with regard to the coating and drying conditions, and coating and curing of the surface hard coat.

(3) Test results

The plastic plate having coatings thus obtained was evaluated in the same manner as in Example 1. The results thus obtained are shown in Table 1.

TABLE 1

| Properties | Ex. 1 | Ex. 2 | Ex. 3 | Ex. 4 | C.E. 1 | C.E. 2 |
| --- | --- | --- | --- | --- | --- | --- |
| Appearance | good | good | good | good | good | good |
| Hardness | A | A | A | A | A | A |
| Adhesion | good | good | good | good | good | good |
| Coloring Properties ΔYI | −0.1 | 0.0 | −0.1 | 0.0 | −0.2 | 0.1 |
| Weathering-resistant adhesion | good | good | good | good | no good | no good |
| Weathering-resistant coloring properties | −0.1 | 0.3 | −0.1 | 0.0 | 7.8 | 1.5 |

Note: C.E. = Comparative Example

INDUSTRIAL APPLICABILITY

The present invention can provide a primer which improves the weathering-resistant adhesion between a substrate and a coating used for improving surface properties of various substrates, such as surface hardness, scuff resistance, wear resistance and surface gloss, and which further inhibits the weathering resistance 20 deterioration of substrates, and a multilayer coated article having a coating of the primer.

We claim:

1. A primer comprising copolymer units of a benzophenone UV absorber represented by the general formula

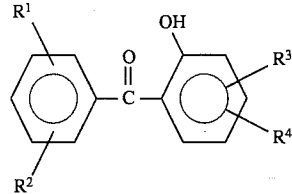

wherein at least one of $R^1$, $R^2$, $R^3$ and $R^4$ is an organic group having an unsaturated double bond, and the others are each a substituent group selected from the group consisting of an alkyl group, an aralkyl group, an aryl group, an aralkoxy group, an allyloxy group, a halogeno group, a sulfonic acid group, an ester of a sulfonic acid group, a carboxylic acid group, an ester of a carboxylic acid group, a phosphoric acid group and an ester of a phosphoric acid group.

2. A primer comprising copolymer units of a benzotriazole UV absorber represented by the general formula

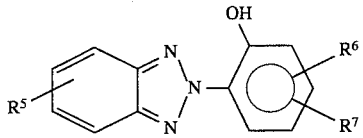

wherein at least one of $R^5$, $R^6$ and $R^7$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group.

3. A primer comprising copolymer units of a phenyl benzoate UV absorber represented by the general formula

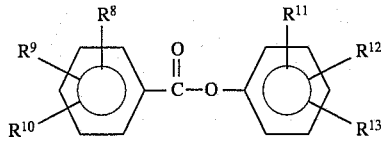

wherein at least one of $R^8$–$R^{13}$ is an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group.

4. A primer as claimed in claims 1 to 3, wherein the group having an unsaturated double bond is selected from the group consisting of a vinyl group, an allyl group, a vinylene group and a (meth)acryloyl group.

5. A primer as claimed in claims 1 to 3 wherein a monomer copolymerized with the UV absorber is selected from the group consisting of (meth)acrylic acid, a (meth)acrylate, a (meth)acrylamide and a vinyl group-containing monomer.

6. A primer as claimed in claim 5, wherein the copolymerization proportion of the UV absorber in the copolymer is from 0.1 to 20% by weight based on the entire amount of the monomer.

7. A primer as claimed in claim 5 wherein said (meth)acrylate is selected from the group consisting of methyl (meth)acrylate, ethyl (meth)acrylate, propyl (meth)acrylate, butyl (meth)acrylate, isobutyl (meth)acrylate, pentyl (meth)acrylate, hexyl (meth)acrylate, cyclohexyl (meth)acrylate, heptyl (meth)acrylate, octyl (meth)acrylate, lauryl (meth)acrylate, dodecyl (meth)acrylate, stearyl (meth)acrylate, 2-hydroxyethyl (meth)acrylate, 2-hydroxy-propyl (meth)acrylate, glycidyl (meth)acrylate, N,N-dimethylaminoethyl (meth)acrylate, N,N-diethylaminoethyl (meth)acrylate, ethylene glycol di(meth)acrylate, diethylene glycol di(meth)acrylate, 1,3-propanediol di(meth)acrylate, 1,4-butanediol di(meth)acrylate, 1,6-hexanediol di(meth)acrylate, neopentyl glycol di(meth)acrylate, trimethylolpropane di(meth)acrylate, trimethylolpropane tri(meth)acrylate, pentaerythritol di(meth)acrylate, pentaerythritol tri(meth)acrylate and pentaerythritol tetra(meth)acrylate.

8. A primer as claimed in claims 1 to 3, wherein a monomer copolymerized with the UV absorber comprises an antioxidant or a light stabilizer having an unsaturated double bond.

9. A multilayer coated article comprising a substrate, a primer coating as defined in claims 1 to 3 and a coat on the primer coating.

10. A multilayer coated article as claimed in claim 9, wherein the coat is an organopolysiloxane coat.

11. A multilayer coated article as claimed in claim 10, wherein the organopolysiloxane coat is formed by using at least one member selected from the group consisting of organosilicon compounds represented by the following general formula (I) or (II) and hydrolyzed products thereof:

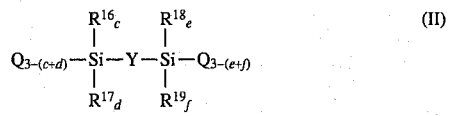

wherein $R^{14}$, $R^{15}$, $R^{16}$, $R^{17}$, $R^{18}$ and $R^{19}$ are each an organic group having from 1 to 10 carbon atoms, X and Q are each a hydrolyzable group, a, c and e are each 0 or 1, b, d and f are each 0, 1 or 2, and Y is an organic group having from 2 to 40 carbon atoms.

12. A multilayer coated article as claimed in claim 10, wherein the organopolysiloxane coat comprises a particulate inorganic oxide.

13. A multilayer coated article as claimed in claim 9, wherein the substrate is selected from the group consisting of a polycarbonate, a polymethyl methacrylate, a copolymer comprising copolymerized units of a methyl methacrylate, a poly[diethylene glycol bis(allyl carbonate)], a polyester, an acrylonitrile-styrene copolymer, a polyvinyl chloride, a polyurethane and an epoxy resin.

14. A multilayer coated article as claimed in claim 9, wherein the proportion of the copolymerized units of the UV absorber is from 0.1 to 20% by weight based on the entire amount of monomers.

15. A multilayer coated article as claimed in claim 9, wherein a monomer copolymerized with the UV absorber comprises an antioxidant or a light stabilizer having an unsaturated double bond.

16. A primer comprising copolymer units of a benzophenone UV absorber represented by the general formula

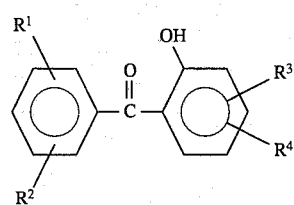

wherein two or more of $R^1$, $R^2$, $R^3$ and $R^4$ are an organic group having an unsaturated double bond, and the others are each a substituent group selected from the group consisting of a hydrogen atom, an alkyl group, an alkenyl group, an aralkyl group, an aryl group, an alkoxy group, an aralkoxy group, an allyloxy group, a hydroxy group, a halogeno group, a sulfonic acid group, an ester of a sulfonic acid group, a carboxylic acid group, an ester of a carboxylic acid group, a phosphoric acid group and an ester of a phosphoric acid group.

* * * * *